Oct. 23, 1951    C. C. CARSON    2,572,009
AIR DRYING UNIT
Filed Dec. 2, 1946    5 Sheets-Sheet 1
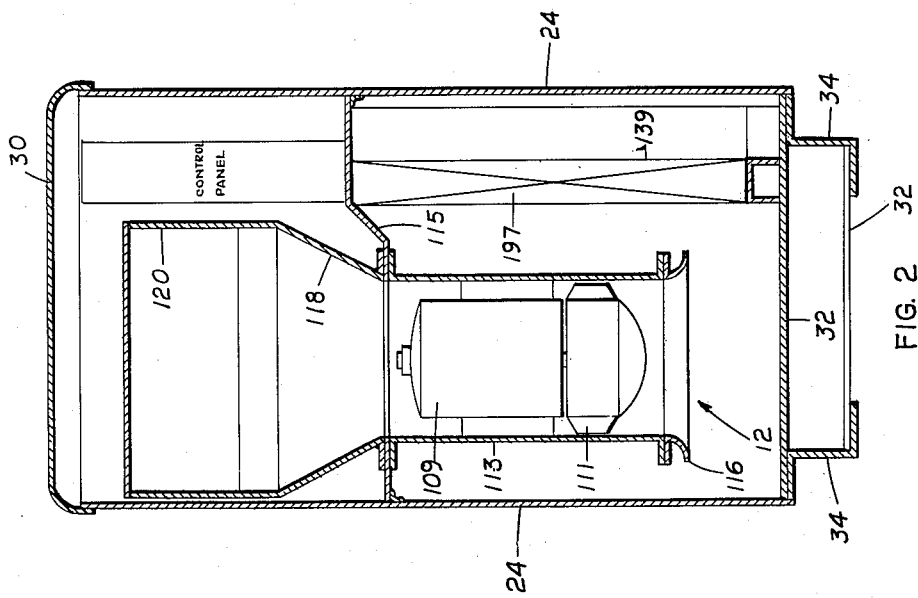
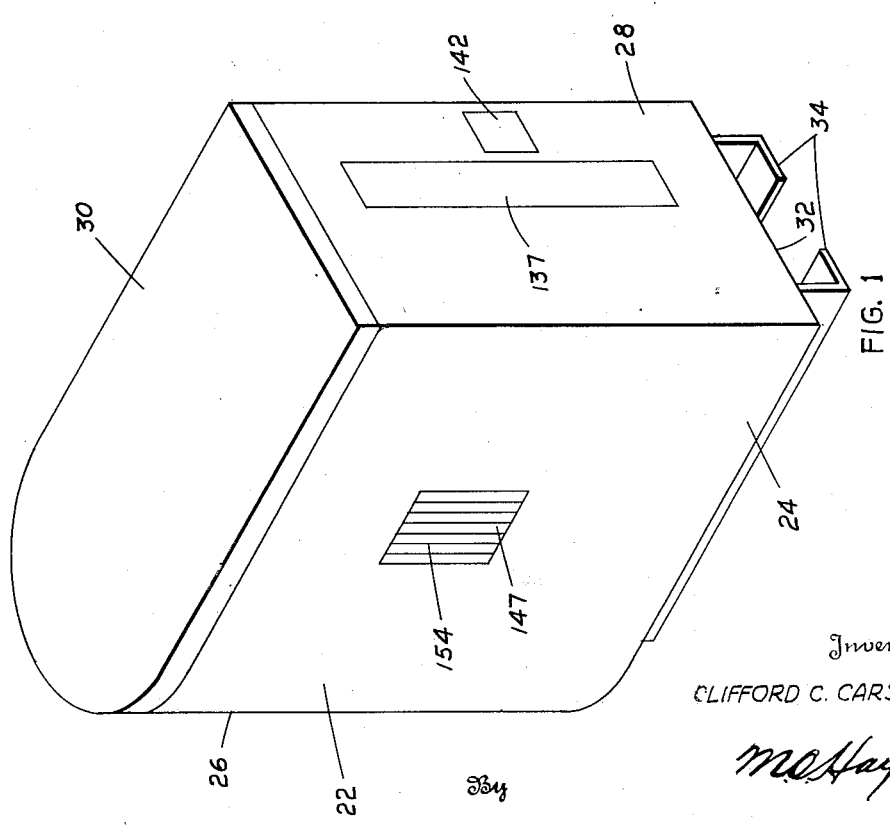
Inventor
CLIFFORD C. CARSON
By M.C. Hayes
Attorney

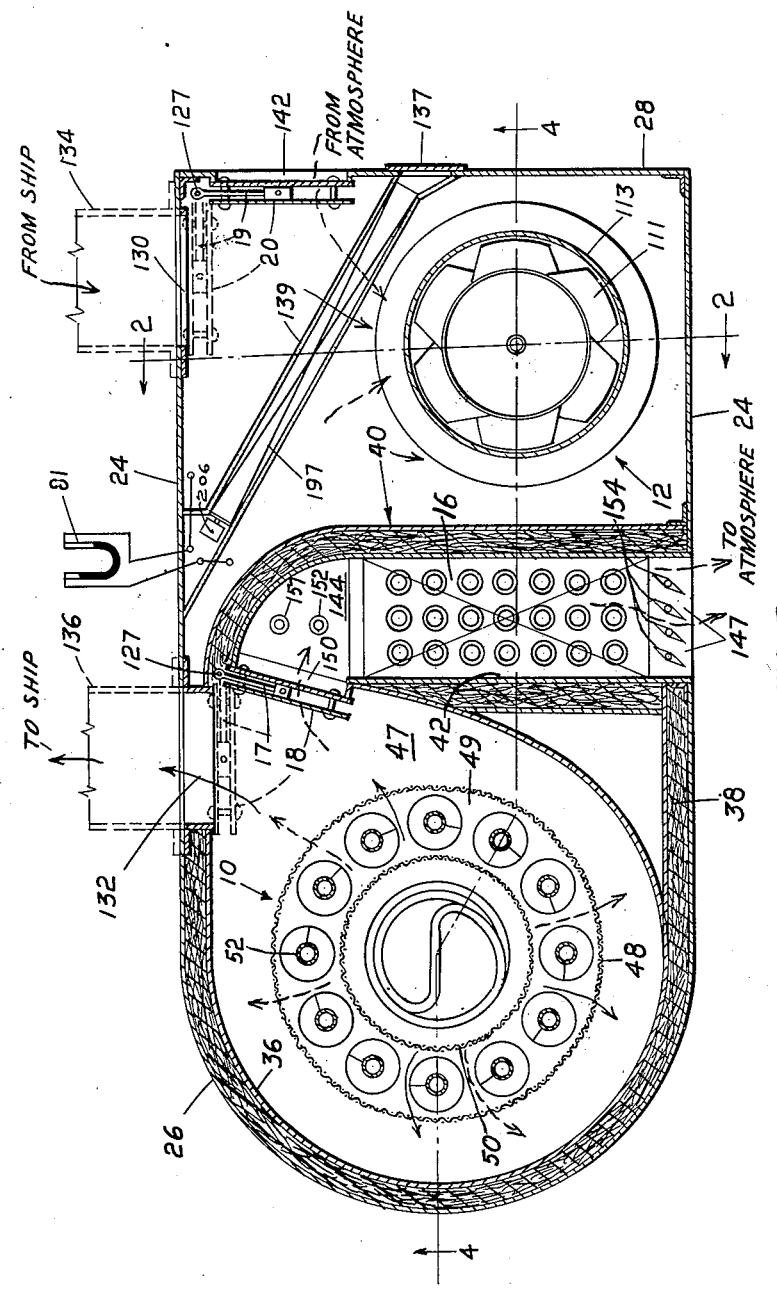

Oct. 23, 1951

C. C. CARSON 2,572,009

AIR DRYING UNIT

Filed Dec. 2, 1946

Inventor
CLIFFORD C. CARSON

By M.C. Hayes

Attorney

Oct. 23, 1951     C. C. CARSON     2,572,009
AIR DRYING UNIT

Filed Dec. 2, 1946     5 Sheets—Sheet 4

Inventor
CLIFFORD C. CARSON

By M. O. Hayes
Attorney

Oct. 23, 1951  C. C. CARSON  2,572,009
AIR DRYING UNIT
Filed Dec. 2, 1946                      5 Sheets-Sheet 5

Inventor
CLIFFORD C. CARSON

Patented Oct. 23, 1951

2,572,009

UNITED STATES PATENT OFFICE 2,572,009

AIR DRYING UNIT

Clifford C. Carson, Washington, D. C.

Application December 2, 1946, Serial No. 713,452

9 Claims. (Cl. 183—4.5)

(Granted under the act of March 3, 1883, as amended April 30, 1928; 370 O. G. 757)

This application is a continuation-in-part of application Serial No. 552,856, now abandoned, filed September 6, 1944, for Air Drying Unit.

This invention pertains to apparatus for use in the conditioning of air and more especially to improvements in dehumidifying apparatus.

During peace time, there will be of necessity, a large number of decommissioned ships tied up at various navy yards. It is desirable, however, to maintain these ships in a substantially ready condition so that they can put to sea in a very short time and to make this possible, the greatest part of the equipment for these ships must be left on board.

It is an object of the present invention to provide apparatus for controlling the moisture-content of the air in the various compartments of ships, which may readily be installed, which will be automatic in operation and which will be rugged and require little or no care in operation or upkeep.

To this end and in accordance with one feature of the invention air to be dehumidified is passed through a bed of desiccant material such as silica gel where the moisture in the air is adsorbed. The desiccant material in absorbing the moisture increases in weight. A weight responsive device is provided which is actuated when the weight of the silica gel indicates that it is in a near saturated condition. The weight responsive device upon being actuated causes other apparatus to be rendered operative to evaporate the moisture from the desiccant by passing preheated air through the desiccant material to evaporate the moisture therein.

It is a characteristic of chemical type of desiccants, such as silica gel and activated alumina, that the vapor pressure of the moisture adsorbed in the desiccant tends to reach equilibrium with the vapor pressure of the air passing through it which is to be dehumidified. It is apparent to those skilled in the art that with air entering the drying unit at a low temperature prevailing in winter the desiccant will absorb a greater amount by weight of water vapor than in the case of warm weather. That is to say, the weight of the water which can be adsorbed by a particular desiccant varies with the temperature of the air passing through it.

Another feature of the invention makes use of a novel means of automatically compensating for this varying weight of adsorbed water in order that the machine will be switched to the reactivation portion of the cycle only after the bed of desiccant has adsorbed all of the water vapor that it is capable of adsorbing at the prevailing dry bulb temperature of the air handled. A further object of the invention is to provide for automatically compensating for the change in percentage of reactivation due to the change in temperature of the gas available for such reactivation. The amount of residual moisture remaining in a desiccant of the dry type is inversely proportional to the temperature at which reactivation is accomplished.

Another property of certain desiccants is that the adsorbing ability is increased by reactivating at a high temperature as compared to a low temperature. Thus it is seen that the ideal temperature of reactivation will be a temperature just below that temperature at which the desiccant material might be damaged by the heat.

In the apparatus illustrated this object is accomplished by automatically varying the amount of air passed through the desiccant bed, a constant rate of heat being supplied to the air stream, such amount of air flow being controlled as a function of the temperature of air leaving the desiccant bed. So long as the air is removing water from the desiccant the temperature of the bed will be lower than the temperature of the air entering the bed. As the reactivation nears completion the temperature drop through the bed decreases until finally when reactivation is completed there is no change in temperature of the air passing through the desiccant. When reactivating gas is at a low temperature the amount of such gas flowing would be decreased by closing dampers in the outlet to weather, such damper position being governed by a thermostat located in the stream of gas leaving the desiccant. When the gas for reactivation enters at a higher temperature, the heating unit would allow too great an increase hence gas entering desiccant would be too hot. The dampers would then automatically open to increase the flow of gas and decrease the temperature of gas passing through the bed. A proper setting of the thermostat would, therefore, allow reactivation to occur at a desirable temperature, regardless of the initial temperature of the gas available for reactivation.

The specific construction and operation of my device will now be described with reference to the accompanying drawings, in which:

Fig. 1 is a perspective outside view of a device according to this invention.

Fig. 2 is a section on the line 2—2 of Fig. 3;

Fig. 3 is a sectional view on line 3—3 of Fig. 4;

Figure 4:
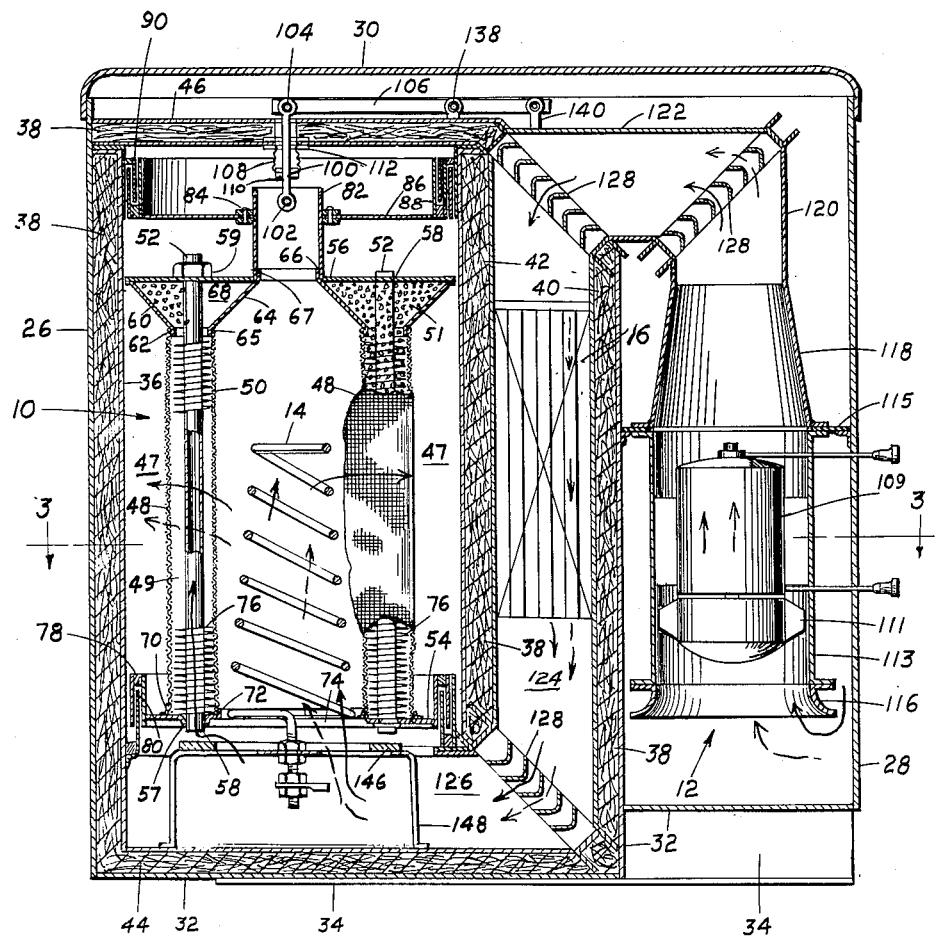
Fig. 4 is a section on the line 4—4 of Fig. 3, some details being omitted for clarity.

The invention illustrated herein comprises in general, a drying unit 10 and an air pump 12 adapted to circulate air from an enclosed space which is to be treated through the drying unit until the latter, which is of the adsorptive type becomes saturated with moisture whereupon the circulation of the air being treated is discontinued, and a stream of heated atmospheric air is circulated by the air pump 12 through the drying unit. The air for regeneration of the unit is heated up by a heating coil 14 and a heat exchange unit 16. The change over from the air being treated during the adsorption cycle to the atmospheric air for regenerating the drying unit is provided for by dampers 18 and 20 which are controlled by an electric circuit indicated generally at 21.

The aforesaid elements are arranged in working relation to each other in housing 22 (Fig. 1) which consists of parallel walls 24, joined at one end by a circular end wall 26, and at the opposite end by a flat end wall 28. The housing is completed by top and bottom walls 30 and 32 (Fig. 2). The lower portion of the housing is supported by two Z-bar supports 34 to afford clearance at the base of the unit so that it may readily be passed through the standard door on shipboard (Figs. 1, 2 and 4).

The dimensions of the housing 22, as described, are such as to permit its passage through a standard door on any one of our fighting ships. As shown in Fig. 3 an inner wall 36 is formed at the rounded end of the unit and part way along the parallel walls 24, the wall 36 extending from the bottom nearly to the top of the housing 22, and insulating material 38 is disposed between these walls so that the drying unit 10 is surrounded on three sides by insulation. Spaced transverse insulating walls 40 and 42 are placed widthwise of the unit between the drying unit 10 and the air pump 12, the wall 42 forming with the circular end wall 26 an enclosure within which the drying unit is disposed. The space between the walls 40 and 42, as shown in Figs. 3 and 4, constitute a passage through which air from the air pump 12 passes on its way to the drying unit 10. The heat exchange unit 16 is disposed in this passage between the walls 40 and 42. The bottom of the housing below the drying unit 10 is also insulated as shown at 44 and a horizontal insulating wall 46 is disposed above the drying unit below the top 30 as illustrated in Fig. 4 to bridge the upper ends of the double walls, and hence to form a substantially closed insulated chamber.

The drying unit itself which is generally indicated by the reference character 10, comprises a pair of concentrically arranged cylindrical foraminous screens 48 and 50, the latter being smaller in diameter than the former so that there is between the walls of the cylinders, an annular space 49. In this annular space 49 there are disposed a plurality of tubes 52. The foraminous cylinders 48 and 50 are held in spaced relation to each other between a pair of end plates 54 and 56 by the tubes 52. As shown herein, this is accomplished by forming openings 58 in the end plates 54 and 56 through which the opposite ends of the tubes 52 are passed and which are fastened to these end plates at one end by welding or crimping and at the other end by nuts 59 threaded on the ends of the tubes. The upper ends of the cylinders 48 and 50 terminate short of the ends of the tubes 52 and between the upper ends of the cylinders 48 and 50 and the plate 56 there is disposed an outer frusto-conical member 60, the lower end 62 of which sets into the upper end of the outer cylinder 48 and an inner frusto-conical member 64 the lower end 65 of which sets over the upper end of the inner cylinder 50.

The aforesaid construction provides an annular trough-shaped space 68 at the upper end of the annular space 49 formed between the cylinder 48 and 50 for a purpose which will appear hereinafter. The frusto-conical member 60 is welded at its upper edge to the plate 56 and a central opening is formed in the plate 56 through which the upper end 67 of the frusto-conical member 64 extends. The lower ends of the cylinders 48 and 50 are held in position by an annular flange 70 welded to the plate 54 and an upturned flange 72 which is formed around the periphery of an aperture 74, the latter being formed in the plate 54 for a purpose which will appear hereinafter.

The material 51 for removing the moisture from the air which will be referred to hereinafter as the desiccant material, is a silica gel or any other suitable desiccant material disposed in the annular space 49 between the cylinders 48 and 50 and during the adsorption cycle it removes water vapor from the air being treated. The physical process which takes place during the adsorption of the moisture changes considerable latent heat into sensible heat. In order that some of this sensible heat may be removed, part of the air passing through the drying unit is bypassed through the tubes 52 and heat transferring fins 76 are provided on the outer surface of the tubes 52 to more readily transfer the heat collected in the body of the desiccant material to the stream of air passing through the tubes 52.

The air to be treated is conducted to the lower end of the unit and passes upwardly through the opening 74 in the lower wall 54, the inner cylinder 50, through the annular space 49 which holds the desiccant material and out through the cylinder 48 to the annular space 47 surrounding the unit and between it and the wall of the housing. To prevent the passage of the air into the space 47 from below the unit before it goes through the bed of desiccant material, the bottom end plate 54 has at its peripheral edge, a reverse U-shaped annular wall 78 which cooperates with a vertical annular wall 80 fastened at its lower edge to the inner wall of the housing surrounding the drying unit in such a manner that the drying unit may have vertical movement and yet the annular space 47 is sealed from the space below the plate 54.

In a like manner, the annular space at the upper end of the drying unit is sealed from the remainder of the housing by a transverse plate 86 fastened at 84 to a neck 82, the latter being welded at 66 to the end 67 of the frusto-conical member 64. The plate 86 is provided with U-shaped walls 88 at its peripheral edge which cooperate with the annular depending wall 90 fastened to the inner wall of the housing. The unit is suspended, for a purpose which will subsequently appear, for vertical movement within the housing at the end of a link 100 which is pivotally fastened at 102 to one end of the neck 82 and at 104 to a horizontal arm 106. To seal the upper end of the unit around the link 100 there is provided a bellows 108 one end of which is clamped between a pair of collars 110 mounted on the link 100, and the other end of which is clamped against the upper wall 46 of the unit by a collar 112.

The air pump 12, is a size A-¼-A standard navy type axial fan and will be hereinafter referred to as a fan, consists of a motor 109 and an impeller blade 111 arranged in a vertical position in a tubular housing 113, Figs. 2 and 4, which has a bell mouth inlet 116 at its lower end and a conical discharge tube 118 at its opposite end, the fan housing 113 and fan 12 being supported in the housing 22 by a transverse partition 115 to which it may be bolted or welded. Connected to the conical discharge tube 118 is a vertical conduit portion 120 having a horizontal portion 122 and a vertical portion 124 extending between the walls 40 and 42 which leads the air discharge from the fan 12 to a space 126 beneath the drying unit 10, that is, below the plate 54. In the conduit, at the bends therein, are turning vanes 128 which smooth out the flow of air as it passes around the bends in the conduit thereby preventing turbulence. The air in its passage through the conduit portion 124 also passes through the heat exchange unit 16 which as will appear hereinafter is inoperative during the adsorption cycle.

The present unit is so constructed that it can be used either by setting it into the compartment in which there is the air to be treated or by placing it outside of the compartment and connecting it to the compartment by conduits. To this end there is formed in the back wall of the housing 22 an inlet opening 130 and an outlet opening 132, Fig. 3. If the unit is merely placed in the compartment and the compartment is then closed, the air in the compartment may be subjected to dehumidification by placing the apparatus into operation whereupon the air pump 12 will draw the air to be treated into the opening 130 and discharge it through the opening 132. If, however, the apparatus is set outside of the compartment, the openings 130 and 132 may be connected to openings formed in the compartment by means of ducts 134 and 136.

After the unit has been operating on the adsorption cycle, and provided a humidostat which is associated with the apparatus, as will appear hereinafter, continues to call for dehumidification, the desiccant material ultimately becomes saturated with moisture. This will increase the weight of the drying unit 10 and cause it to tip the arm 106 about a pivot 138, Figs. 4 and 6, which will in turn raise a rod 140, Figs. 4 and 6, connected to the arm 106 so as to trip a limit switch 186, Figs. 6 and 7, which will initiate the regenerative cycle.

Figure 5:
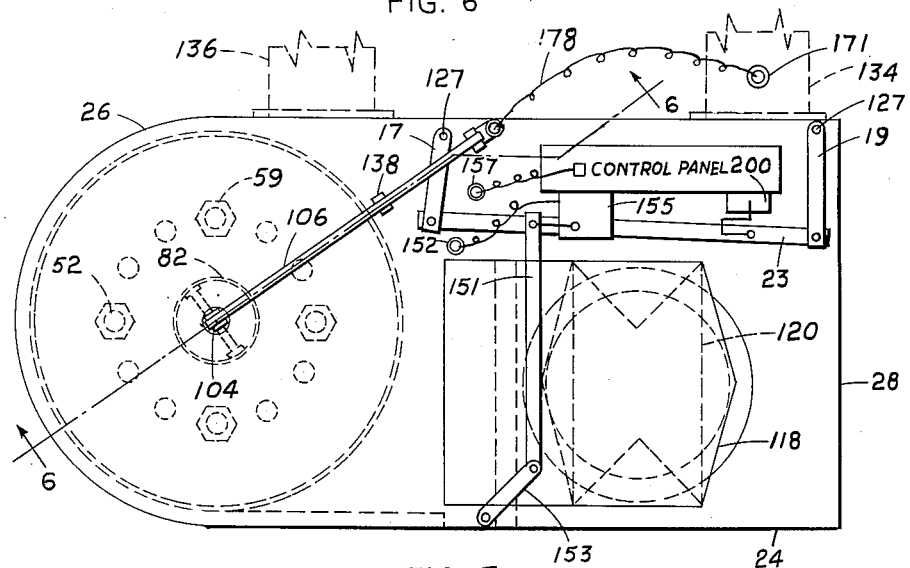
Fig. 5 is a top plan view of a device according to this invention with cover removed.

During the regenerative cycle, the desiccant material 51 is dried out by the passage of heated air through the desiccant material 51. To this end and in response to the operation of the aforesaid limit switch 186, the dampers 18 and 20 are caused to close the openings 130 and 132 and to uncover an opening 142 formed in the end wall 28 of the housing 22 through which air is sucked by the air pump 12 and is conveyed through the conduit portions 120, 122 and 124 to the compartment 126 below the drying unit 10 where it passes upwardly to the inside of the cylinder 50 in contact with the heating coil 14. The dampers 18 and 20 are actuated by a damper motor 200, Figs. 5 and 7, the operation of which will appear hereinafter. To this end U-shaped arms 17 and 19 are fastened at one end to the dampers 18 and 20 and are connected at their opposite ends to a link 23, the latter being adapted to be reciprocated by the motor 200 to pivot the U-shaped arms 17 and 19 about their bights 127 in one direction or the other to swing the damper from a position covering the openings 130 and 132 to a position covering the openings 142 and 150 or vice versa.

After being heated, the air passes through the annular wall of the desiccant material 51 into the space 47 and from thence through the opening 150, which is uncovered by the damper 18 at the same time that the damper 20 uncovers the opening 142, into a conduit 144 which conducts it through the heat exchange unit 16 and discharges it through an opening 147 in one of the side walls. In order to prevent the heated air from being bypassed through the tubes 52 during the regenerative cycle, there is provided in the chamber space 126 below the plate 54 an annular sealing ring 146 with which the lower ends of the tubes 52 are adapted to be brought into contact by the downward movement of the drying unit 10 when it becomes loaded with moisture. This annular sealing ring 146 is supported in the chamber space 126 by a bracket 148 resting on the bottom wall 32 of the housing 22.

It has been determined by experiment that if the desiccant material 51 is regenerated at a fairly high temperature it will have better adsorption properties at low humidities than if it were regenerated at a low temperature. A temperature of about 350° F. is suitable and in order to maintain the bed of desiccant material 51 at this temperature and to keep it substantially uniform throughout the drying cycle, the volume of air passing through the desiccant material 51 during the regenerative cycle is governed by centrally pivoted multi-blade dampers 154 placed in the discharge opening 147 beyond the heat exchanger 16 as illustrated in Fig. 3, the dampers 154 in turn being controlled by a thermostat 152 disposed in the air stream just ahead of the heat exchanger 16 in the conduit 144, as shown in Fig. 3. The amount of opening or closing of the louvre damper 154 will be determined by the temperature of the air stream coming from the bed of desiccant material 51 through the opening 150. The louvre dampers 154 are operated by a motor 155 and links 151 and 153, the motor being in the circuit containing the thermostat 152 and being connected in such a manner that it will operate in reverse directions to open or close the discharge opening 147.

Figure 6:
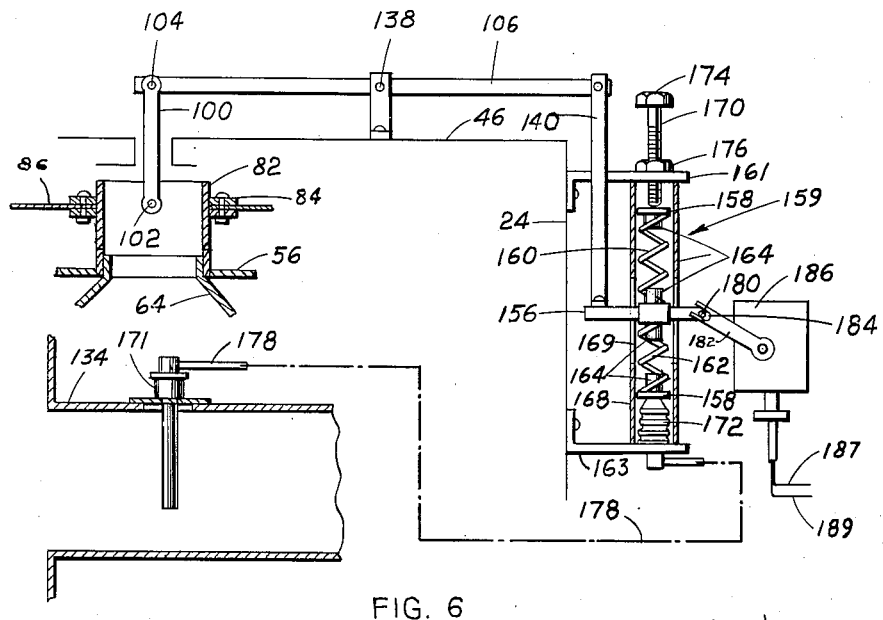
Fig. 6 is a diagrammatic view on line 6—6 of Fig. 5.

The control mechanism 159 for operating the limit switch 186 which causes the unit to change from the adsorption cycle to the regenerative cycle, and vice versa, is shown in Fig. 6. Specifically, a horizontal arm 156 extends from the lower end of the rod 140 through vertical slots 169 in vertical walls 168 which are secured between upper and lower supporting brackets 161 and 163 mounted on a side wall 24 of the housing 22. Between these walls 168 are slidably disposed a pair of plates 158 having knubs 164 fixed thereto. Corresponding knubs 164 are fastened to the opposite sides of the arm 156. Between the opposite sides of the arm 156 and the parallel plates 158 there are disposed a pair of upper and lower springs 160 and 162, the springs being held in position by the knubs 164 on the arm 156 and on the plates 158.

The springs 160 and 162 tend to center the arm 156 with respect to the plates 158 and to counterbalance the weight of the drying unit 10. Between the lower plate 158 and the lower brackets 163 there is disposed a bellows 172. The upper bracket 161 has a screw 170 adjustably threaded therethrough and presses against the upper movable plate 158. The screw 170 has a head 174 thereon to facilitate rotation thereof, and hence adjustment of the position of the upper plate 158, so that an initial balance may be obtained. The screw is adapted to be locked in any given position by a lock nut 176.

The bellows 172 is hollow and is connected to a capillary tube 178 which passes through the lower bracket 163, the tube 178 being connected to a thermostat 171 which is disposed in the inlet duct 134. In the bellows 172 capillary tube 178 and thermostat 171 is a volatile fluid which upon expansion will expand the bellows and hence compress the lower spring 162. The pressure of the bellows 172 compensates for difference in temperature, that is, at a high temperature during warm weather the desiccant material 51 will take up less moisture than at a lower temperature. Hence, to make the apparatus operate at optimum capacity it is desirable to cause it to remain in the adsorption stage until the desiccant 51 has adsorbed the maximum amount of moisture. This is accomplished by decreasing the tension in the lower spring 162 as the temperature decreases so that in cold weather it will take a greater weight to overbalance the limit switch 186. This is taken care of automatically by the bellows 172 which will apply to or remove pressure from the lower spring 162; thus at high temperature, the lower spring 162 is compressed thereby causing it to resist overbalancing until the desiccant material 51 has taken up enough moisture to saturate it, whereas if the temperature is low, the pressure of the bellows 172 will be lessened against the lower spring 162, thereby allowing the drying unit to adsorb a greater amount of moisture before it overbalances the upper spring 160. The arm 156 carries near its end a pin 180 which cooperates with a slot 184 formed in the end of a lever 182 which upon movement will operate the limit switch indicated at 186.

The air being treated and also the air employed for regeneration of the desiccant material 51 carries dust, and to prevent clogging up the bed of desiccant material 51 which would render it ineffective, it is desirable to filter the air before it reaches the desiccant material 51. To this end a filter 197, Fig. 3, is placed through access door 137 into a filter frame 139 across the openings 130 and 142 through which the air from either of these openings must pass. The filter core 197 may be removed from frame 139 through door 137 when filled with dust and be replaced by a fresh filter core. To prevent the apparatus from being started while the core is not in position within the filter frame, a switch 206 which will be described hereinafter is placed in the filter frame 139 in a position to be opened by the removal of the filter core 197 thereby to break the circuit so that the apparatus will become inoperative. The condition of the filter core 197, that is the amount of dust that it contains, may be determined visibly by a draft gauge 81 connected to the opposite sides of the filter frame 139.

Figure 7:
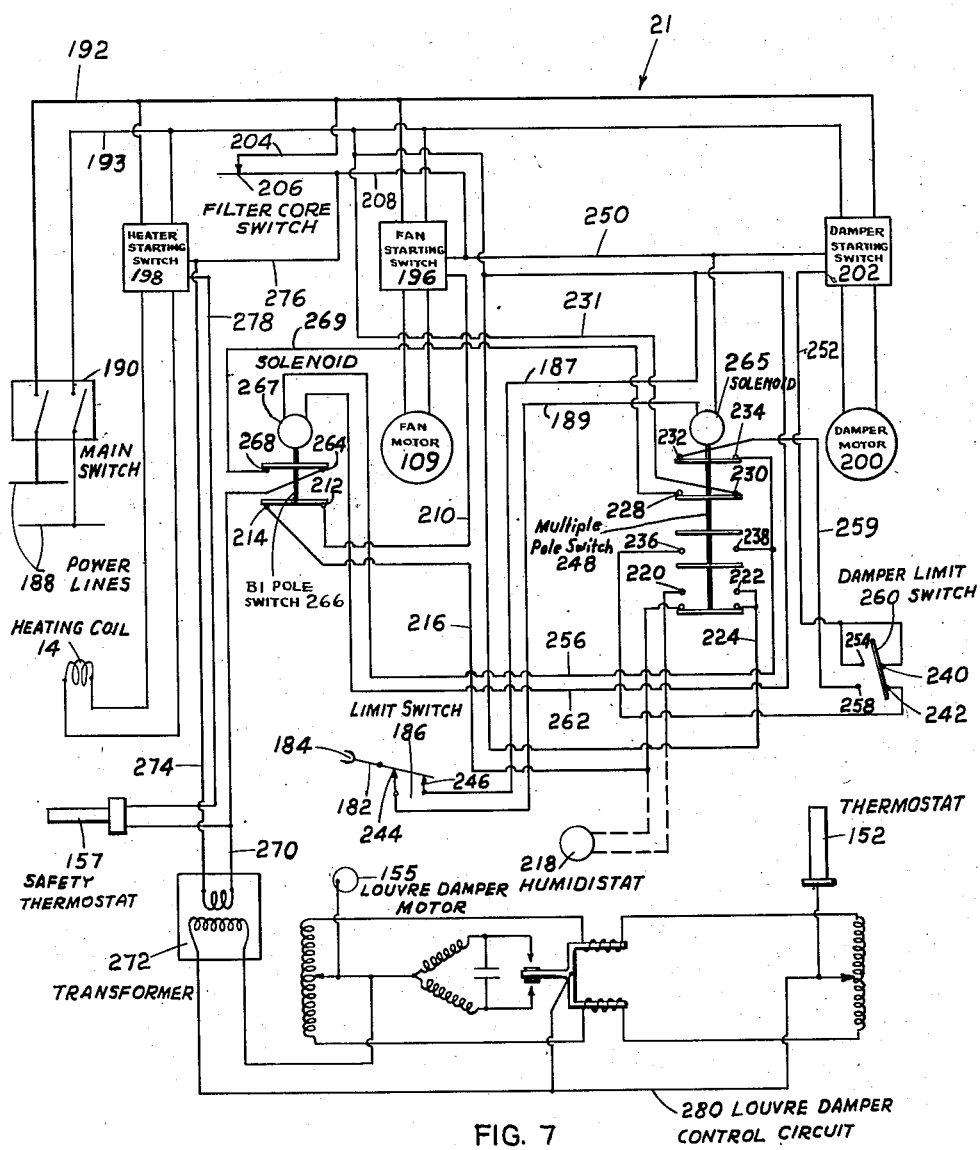
Fig. 7 illustrates the electrical control circuits of the machine.

The electric circuit for operating the unit on its adsorption and regenerative cycles is controlled by the limit switch 186 as referred to above, and for convenience in the description of the circuit, is shown in Fig. 7 diagrammatically. The circuit, which is as a whole designated by the reference character 21, is supplied with power from power lines 188 by way of a main switch 190 and power conductors 192 and 193. Connected across the conductors 192 and 193 is the fan motor 109 which is provided with a fan starting switch 196. The heating coil 14 is also connected across the conductors 192 and 193 and have a heater starting switch 198. In the operation of the device as heretofore pointed out, the dampers 18 and 20 are operated to cut off the supply of air from the compartment being treated and to permit the introduction of atmospheric air and these dampers are operated by a damper motor 200 which is connected across the conductors 192 and 193 by way of a damper motor starting switch 202.

During the adsorption cycle only the fan 12 is in operation, since during this period all that takes place is the recirculation of the air to be treated through the drying unit 10. The circuit permitting operation of the fan 12 during this period may be traced in Fig. 7 from the power conductor 192 through a conductor 204, the filter core switch 206, conductor 208, fan starting switch 196, a conductor 210, bipole switch terminals 212 and 214, a conductor 216, a humidostat 218 in the space being treated, and terminal 220 to the terminal 222 which is directly connected by the conductor 224 to the power conductor 193. It is to be observed that this circuit is normally closed through the filter core switch 206. The filter core switch 206 is held closed only so long as there is a filter core 197 in the filter frame 139, as previously described. If when this filter core is being replaced, some one attempts to start the machine, the filter core switch 206 will prevent operation thereof.

In this condition, that is during the adsorption cycle, the heat coil 14 is not in operation, and the damper motor 200 is inoperative. That these elements are not in operation will be seen by reference to these circuits. Referring to the circuit for the heat coil 14, it can be traced from the power conductor 192 by way of conductor 204, filter core switch 206, conductor 276, heater starting switch 198, conductor 278, safety thermostat 157, conductor 270, contacts 264 and 268, conductor 269 to terminal 228. Since the terminal 228 is not connected across the terminal 230 during the adsorption cycle, and the terminal 230, in turn is connected to the opposite one of the conductors 193 by the conductor 231, the heater circuit is opened.

In like manner, beginning at one side of the conductor 192 and going by way of the conductor 204, filter core switch 206, conductor 208, conductor 250, damper motor starting switch 202, conductor 252, terminals 254 and 258, conductor 259 to terminals 232 and 234, during the adsorption cycle, this circuit is here broken and there is no connection between terminals 232 and 234 and the circuit can only be completed during the adsorption cycle through conductors 256 and 262 back to the opposite power conductor 193.

When the desiccant material is completely saturated and the limit switch 186 is operated so as to initiate the regenerative cycle, the operation of the limit switch 186, as seen in Fig. 7, through conductors 187 and 189, closes the contacts 244 and 246. The closing of the two contacts 242 and 246 will energize solenoid 265 to cause a multi-pole switch 248 to move to its opposite position. When this happens, contacts 232 and 234 will be closed and contacts 236 and 238 will be broken. As a result, the damper motor circuit will be completed by way of the conductor 250, the damper motor starting switch 202 and the contacts 254 and 258, conductor 259 to operate the damper motor 200. After the damper motor has moved the damper to close the openings 130 and 132 the damper limit switch 260 will snap away from the contacts 254 and 258 and into contact with the contacts 240 and 242.

During the period when the damper motor 200 is moving the dampers 19 and 20 to the position covering the openings 130 and 132 from the position covering the openings 142 and 150, it is desirable to discontinue the operation of the fan. This is accomplished in the circuit shown herein by movement of the multi-pole switch 248 which upon closing the contacts 232 and 234 causes a solenoid 267 to move a bi-pole switch 266 upwardly thereby to disconnect the terminals 212 and 214. This breaks the fan motor circuit. When the damper limit switch 260 has moved over to complete the circuit through the terminals 240 and 242, however, the fan motor circuit is again established to the bi-pole switch 266 causing it to reverse its position and hence to again complete the circuit through contacts 212 and 214, so that the fan is again put in operation. In this position of the bi-pole switch 266 the heater 14 is also set in operation, as may be seen by reference to Fig. 7, its circuit being completed from the conductor 192 by way of the conductors 276, 278, the safety thermostat 157, conductor 270, the terminals 264 and 268, conductor 269 and the terminals 228 and 230 via conductor 231 to power conductor 193. A transformer 272 is connected in this heater circuit by way of conductors 270 and 274 for supplying power to a louvre damper control circuit 280. The circuit 280 is controlled by the thermostat 152 to operate the louvre damper, motor 155 for changing the position of the louvre dampers 154 in accordance with the temperature prevailing at outlet 150. Since this circuit is conventional and does not present any novel subject matter, it will not be described further herein.

While the unit as thus far described and illustrated shows the drying unit in a vertical position, such construction is not necessary to the operation of the machine. The vertically disposed foraminous cylinders 48 and 50 may be disposed in a horizontal position or removable trays may be employed if this is found to be convenient. In any construction employed, the units will be arranged to actuate the operating circuit in a manner similar to that described above.

Having described the construction of the apparatus in detail, the operation thereof will now be clear as set forth hereinafter. The apparatus having been placed in or adjacent to a compartment to be treated, and in the latter case connected to the compartment by the conduits 134 and 136, is started by closing the main switch 190. If the condition of the air in the compartment to be treated is such as to cause the humidostat 218 to call for operation of the drying unit 10, the operating circuit 21 will be closed and the fan 12 will immediately start and will suck air from the compartment being treated through the opening 130 into the intake side of the fan through the bell mouth 116 and will discharge it into the vertical conduit portion 120 where it will be conveyed by way of the conduit portions 122 and 124 to the chamber 126 below the drying unit 10.

At this time, since there is less than the maximum moisture in the desiccant material 51, the unit 10 will be in its uppermost position, as its weight will be counteracted by the springs 160 and 162 which tend to hold the rod 140 downwardly in opposition to the weight of the drying unit 10. Since the drying unit 10 is in its uppermost position, the lower ends of the tubes 52 will be out of contact with the sealing ring 146 and hence part of the air sucked in by fan 12 will pass upwardly through the inside of the cylinder 50 and another part of the air will pass upwardly through the tubes 52. The air which passes upwardly to the inside of the cylinder 50 cannot pass through the upper end of the cylinder but must pass through the walls of the cylinder and the desiccant material 51 where it will give up its moisture to the desiccant material 51.

The adsorption of the moisture is part of a physical action in which latent heat of the vapor is changed to sensible heat, and this sensible heat is substantially absorbed by the air passing through the tubes 52, the fins 76 facilitating such absorption. The air from the upper ends of the tubes 52 and the air which passes through the desiccant material 51 recombines and is discharged through the outlet 132 to the chamber being treated. When the bed of desiccant material 51 has become substantially saturated, the weight of the moisture and unit 10 is such as to overbalance the action of the springs 160 and 162 and causes it to move downwardly until the lower ends of the tubes 52 rest on the sealing ring 146.

This downward movement of the drying unit 10 overcomes the toggle spring in limit switch 186 and actuates to the regenerative cycle. This causes the damper motor 200 to be put into operation, which in turn moves the dampers 18 and 20 to the position covering the opening 130 and 132 and uncovering the openings 142 and 150. During the movement of the dampers from one position to the other, the fan 12 is temporarily stopped as described previously. As soon as the openings 130 and 132 are closed, however, the circuit is so set up that the fan 12 is again put into operation and the heater 14 is energized. Air is then drawn in from the atmosphere or other source and is conducted to the chamber 126 where it passes upwardly through the inside of the cylinder 50 and is heated by the heater 14 prior to its passage through the body of the desiccant material 51.

Because the lower ends of the tubes 52 are closed all of the heated air passes through the body of desiccant material 51. This air is discharged through the opening 150 and through the heat exchanger 16 which is adapted to transfer part of the heat to the incoming air to preheat it and hence to provide for more economical operation of the apparatus.

The temperature of the desiccant material 51 is maintained substantially uniform by the thermostat 152 which is placed adjacent to the opening 150, the thermostat being adapted to cause the louvre damper motor 155 to vary the volume of air which is driven through the desiccant material 51. To prevent operation of the unit 10 if it becomes overheated, there is provided the safety thermostat 157 which will operate to interrupt the heater circuit if the bed of desiccant material 51 reaches a predetermined critical temperature which is approximately 500° F. in the case of silica gel.

When sufficient heated air has been passed through the body of desiccant material 51 to evaporate substantially all the moisture therein, the weight of the drying unit 10 becomes less and the springs 160 and 162 overcomes the resistance of the toggle spring in the limit switch 186 and raise the drying unit 10 by means of the above described linkage, and thus operates the limit switch 186 so that the adsorption cycle is again brought into operation. The unit 10 will automatically repeat the cycle of operation related above as long as the humidostat 218 in the compartment being treated calls for such treatment and will then automatically stop.

While the unit has been described herein as useful for conditioning the air in decommissioned ships to keep their contents in good condition, it is also within the scope of the invention to employ such units in merchant vessels to preserve goods and cargo in a satisfactory condition as the vessel passes from one climate to another. It is especially valuable where perishable cargo is being transported, such as fruits, etc.

The invention described herein may be manufactured and used by or for the Government of the United States of America for governmental purposes without the payment of any royalties thereon or therefor.

What is claimed is:

1. In a machine for removing water vapor from air having an adsorbing cycle and a regenerative cycle, a bed of desiccant material comprising concentrically arranged foraminous hollow cylinders having an annular space between them in which there is disposed a desiccant material, a plurality of impervious tubes in the annular space arranged parallel to the axis of the cylinders, the ends of which tubes terminate at the opposite ends of the cylinders, means including conduits and a fan for circulating a stream of the air to be treated through the apparatus, means including air passages connecting with said conduits for causing a portion of the air to pass through the annular wall of the desiccant material from the inner cylinder outwardly, and another part through the tubes to remove the heat added to said desiccant material by the dehumidifying action thereof, and motor operated valve means for closing the ends of the tubes during the regenerative cycle to cause all of the air circulated through the apparatus to pass through the desiccant material, said valve means being operative in response to closing a circuit thereto as the desiccant material approaches saturation.

2. In a machine for removing water vapor from air having an adsorbing cycle and a regenerative cycle, a bed of desiccant material comprising a hollow cylindrical body of desiccant material, impervious tubes extending through said cylindrical body of desiccant material from end to end thereof parallel to the axis thereof, motor driven fan means communicating with conduit means for creating a pressure differential which results in the movement of the air to be treated radially through said wall and axially through the tubes to remove the heat added to said desiccant material by the dehumidifying action thereof, motor driven damper means for interrupting the passage of the air to be treated through the bed and tubes when said desiccant material is substantially saturated and for causing heated air to be introduced under pressure to the inside of said cylindrical body, means responsive to substantial saturation of the desiccant material for operation of said damper means and linkage means connected operatively to the damper means simultaneously to close the ends of the tubes thereby to prevent the passage of the air axially through the body of desiccant material.

3. In a drying apparatus, a bed of desiccant material, a fan having suction and discharge sides, a conduit connecting the discharge side to the bed of desiccant material, a heater between the bed of desiccant material and the discharge side of the fan, a conduit connected to the suction side of the fan having ports therein open to the fluid to be treated and to the atmosphere, a damper in the suction conduit operable to close one of said ports, and gravity operated switch and motor means operable by the loading of the desiccant material to cause the damper to close the port open to the fluid to be treated, to stop the fan during the movement of the damper and to render the fan and heater operative upon completion of the movement of the damper.

4. In a drying apparatus having an adsorbing cycle and a regenerative cycle, a bed of desiccant material, a plurality of impervious tubes extending therethrough, a fan having suction and discharge sides, a conduit connecting the discharge side of the bed and tubes, a heater between the bed and discharge side of the fan, means rendering said heater inoperative during the adsorbing cycle, a conduit connected to the suction side of the fan having ports therein open to the fluid to be treated and to a drying fluid, a damper in the suction conduit operable to close one of said ports, switch means operable by the loading of the desiccant material, and motor driven linkage means controlled by said switch means to cause the damper to close the port open to the fluid to be treated, to close said tubes and to render the heater operative.

5. In a drying apparatus a body of desiccant material, means for circulating air to be treated through the body of desiccant material to adsorb the moisture therein, means for counterbalancing the body of desiccant material comprising a pivoted lever, a link connecting said body of desiccant material to said lever, yieldable means secured to said pivoted lever counterbalancing said body of desiccant material, said yieldable means being adjustable to overbalance the weight of the body of desiccant material when same is substantially free of adsorbed moisture, and to be overbalanced by the weight of the body of desiccant material when same is substantially saturated, electroresponsive means including a circuit and switch operable by the movement of the body of desiccant material from unsaturated to saturated position for initiating a regenerative cycle and thermoexpansive biasing means attached to the yieldable means and in the treated air stream for automatically varying the tension in the yieldable means in inverse ratio to the temperature of the air being treated and thereby decrease its yield point in proportion to the decrease in saturation weight as the temperature of the air being treated rises.

6. In a drying apparatus, a body of desiccant material, means for circulating air to be treated through the body of desiccant material to adsorb the moisture therein, means for counterbalancing the body of desiccant material comprising a pivoted lever, a link connecting said body of desiccant material to said lever, yieldable means secured to said pivoted lever counterbalancing said body of desiccant material, said yieldable means being adjustable to overbalance the weight of the body of desiccant material when same is substantially free of adsorbed moisture, and to be overbalanced by the weight of the body of desiccant material when same is substantially saturated, electroresponsive means including a circuit and a switch operable by the movement of the body of desiccant material from unsaturated to saturated position for initiating a regenerative cycle and thermoresponsive means attached to the yieldable means and in the treated air space to automatically vary the yield point in the yieldable counterbalancing means as a function of the adsorbing capacity of the body of desiccant material relative to the psychrometric condition of the air being treated.

7. In a drying apparatus, a body of desiccant material, means for circulating air to be treated through the body of desiccant material to adsorb the moisture therein, means for counterbalancing the body of desiccant material comprising a pivoted lever, a link connecting said body of desiccant material to said lever, yieldable means comprising two springs oppositely disposed and tensioned and secured to said pivoted lever counterbalancing said body of desiccant material, said yieldable means being adjustable to overbalance the weight of the body of desiccant material when same is substantially free of adsorbed moisture, and to be overbalanced by the weight of the body of desiccant material when same is substantially saturated, means attached to the junction of said springs and operable by the movement of the body of desiccant material from unsaturated to saturated position for initiating a regenerative cycle, means for manually adjusting the tension of one of said springs, a bellows biasing the other of said springs, a bellows controlling thermostat, said thermostat being located in the air stream being treated before the air enters the desiccant bed, the load on said second spring being thereby automatically varied inversely with the temperature of the air being treated, thus compensating for the varying saturation point of adsorbed moisture in the desiccant bed as the temperature of air being treated changes.

8. In a drying apparatus, a body of desiccant material, means for circulating air to be treated through the body of desiccant material to adsorb the moisture therein, means for counterbalancing the body of desiccant material comprising a pivoted lever, a link connecting said body of desiccant material to said lever, yieldable means comprising two springs oppositely disposed and tensioned and secured to said pivoted lever counterbalancing said body of desiccant material, said yieldable means being adjustable to overbalance the weight of the body of desiccant material when same is substantially free of adsorbed moisture and to be overbalanced by the weight of the body of desiccant material when same is substantially saturated, means attached to the junction of said springs and operable by the movement of the body of desiccant material from unsaturated to saturated position for initiating a regenerative cycle, means for manually adjusting the tension of one of said springs, a bellows biasing the other of said springs, a bellows controlling thermostat, a capillary tube connecting said thermostat to said bellows, said thermostat being located in the air stream being treated before the air enters the desiccant bed, the load on said second spring being thereby automatically varied inversely with the temperature of the air being treated, thus compensating for the varying saturation point of adsorbed moisture in the desiccant bed as the temperature of air being treated changes.

9. In a drying apparatus, a body of desiccant material, means for circulating gas to be treated through the body of desiccant material to adsorb the moisture therein, yieldable means counterbalancing the weight of the body of desiccant material, said yieldable means being adjustable to overbalance the weight of the body of desiccant material when same is substantially free of adsorbed moisture, and to be overbalanced by the weight of the body of desiccant material when same is substantially saturated, means operable by the movement of the body of desiccant material from unsaturated to saturated position for initiating a regenerative cycle, and means including a thermostat in the circulating gas to automatically vary the yield point in the yieldable counterbalancing means as a continuous function of the adsorbing capacity of the body of desiccant material relative to the psychrometric condition of the gas being treated.

CLIFFORD C. CARSON.

REFERENCES CITED

The following references are of record in the file of this patent:

UNITED STATES PATENTS

| Number | Name | Date |
| --- | --- | --- |
| 2,066,847 | McShea | Jan. 5, 1937 |
| 2,075,036 | Hollis | Mar. 30, 1937 |
| 2,079,157 | De Lin | May 4, 1937 |
| 2,088,954 | Gregg | Aug. 3, 1937 |
| 2,101,555 | Moore et al. | Dec. 7, 1937 |
| 2,160,831 | Colby et al. | June 6, 1939 |
| 2,233,189 | Altenkirch | Feb. 25, 1941 |
| 2,257,478 | Newton | Sept. 30, 1941 |
| 2,297,763 | Higley et al. | Oct. 6, 1942 |
| 2,309,961 | King, Sr. | Feb. 2, 1943 |
| 2,315,715 | Leibing | Apr. 6, 1943 |
| 2,328,521 | Whittmann | Aug. 31, 1943 |